United States Patent
Arbjerg et al.

(10) Patent No.: US 10,766,524 B2
(45) Date of Patent: Sep. 8, 2020

(54) HYDRAULIC STEERING UNIT

(71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 247 days.

(21) Appl. No.: 15/970,311

(22) Filed: May 3, 2018

(65) Prior Publication Data

US 2018/0319431 A1    Nov. 8, 2018

(30) Foreign Application Priority Data

May 8, 2017    (DE) .................. 10 2017 109 799

(51) Int. Cl.
*B62D 5/083* (2006.01)
*B62D 5/097* (2006.01)
(Continued)

(52) U.S. Cl.
CPC .............. *B62D 5/083* (2013.01); *B62D 5/065* (2013.01); *B62D 5/08* (2013.01); *B62D 5/093* (2013.01); *B62D 5/14* (2013.01); *B62D 5/097* (2013.01)

(58) Field of Classification Search
CPC ......... F15B 11/006; F15B 2211/30575; B62D 5/083; B62D 5/0835; B62D 5/0837; B62D 5/093; B62D 5/097
(Continued)

(56) References Cited

U.S. PATENT DOCUMENTS 4,860,846 A    8/1989 Uchida et al.
4,862,985 A *  9/1989 Uchida .................. B62D 6/00
                                                  180/423
(Continued)

FOREIGN PATENT DOCUMENTS

CN         36107704 A    7/1978
CN        106043410 A   10/2016
(Continued)

OTHER PUBLICATIONS

International Search Report for U.S. Appl. No. PCT/EP2018/060040 dated Apr. 19, 2018.

*Primary Examiner* — Abiy Teka
*Assistant Examiner* — Michael Quandt
(74) *Attorney, Agent, or Firm* — McCormick, Paulding & Huber PLLC

(57) ABSTRACT

A hydraulic steering unit (1) is described comprising a supply port arrangement having a pressure port (P) connected to a main flow path (5) and a tank port (T) connected to a tank flow path (6), a working port arrangement having a left working port (L) connected to a left working flow path (7) and a right working port (R) connected to a right working flow path (8), a bridge arrangement (14) of variable neutral open orifices, said bridge arrangement (14) comprising a first left orifice (A2L) connected to a main flow path (5) and to the left working flow path (7), a first right orifice (A2R) connected to a main flow path (5) and to the right working flow path (8), a second left orifice (A3L) connected to the left working flow path (7) and to the tank flow path (6), and a second right orifice (A3R) connected to the right working flow path (8) and to the tank flow path (6). Such a steering unit has a good steering behavior but can function as a closed-center solution. To this end a further variable orifice arrangement is arranged between the supply port (P)
(Continued)

arrangement and the working port arrangement (T), which further orifice arrangement is closed in neutral position.

2 Claims, 1 Drawing Sheet

(51) Int. Cl.
    *B62D 5/093*     (2006.01)
    *B62D 5/065*     (2006.01)
    *B62D 5/08*     (2006.01)
    *B62D 5/14*     (2006.01)

(58) Field of Classification Search
    USPC .............................. 180/441, 417, 442, 403
    See application file for complete search history.

(56) References Cited

U.S. PATENT DOCUMENTS

| | | | |
|---|---|---|---|
| 6,035,760 A * | 3/2000 | Suzuki | B62D 5/083 |
| | | | 91/375 R |
| 9,550,521 B2 * | 1/2017 | Andersen | B62D 5/093 |
| 10,161,425 B2 * | 12/2018 | Liljenberg | F15B 11/08 |

FOREIGN PATENT DOCUMENTS

| | | | |
|---|---|---|---|
| DE | 3744346 A1 | 7/1988 | |
| DE | 102005011526 A1 | 10/2006 | |
| EP | 2786915 A1 | 10/2014 | |
| EP | 3031699 A2 | 6/2016 | |
| EP | 3078571 A1 | 10/2016 | |
| EP | 3093214 A1 | 11/2016 | |
| WO | 9634789 A1 | 11/1996 | |

* cited by examiner

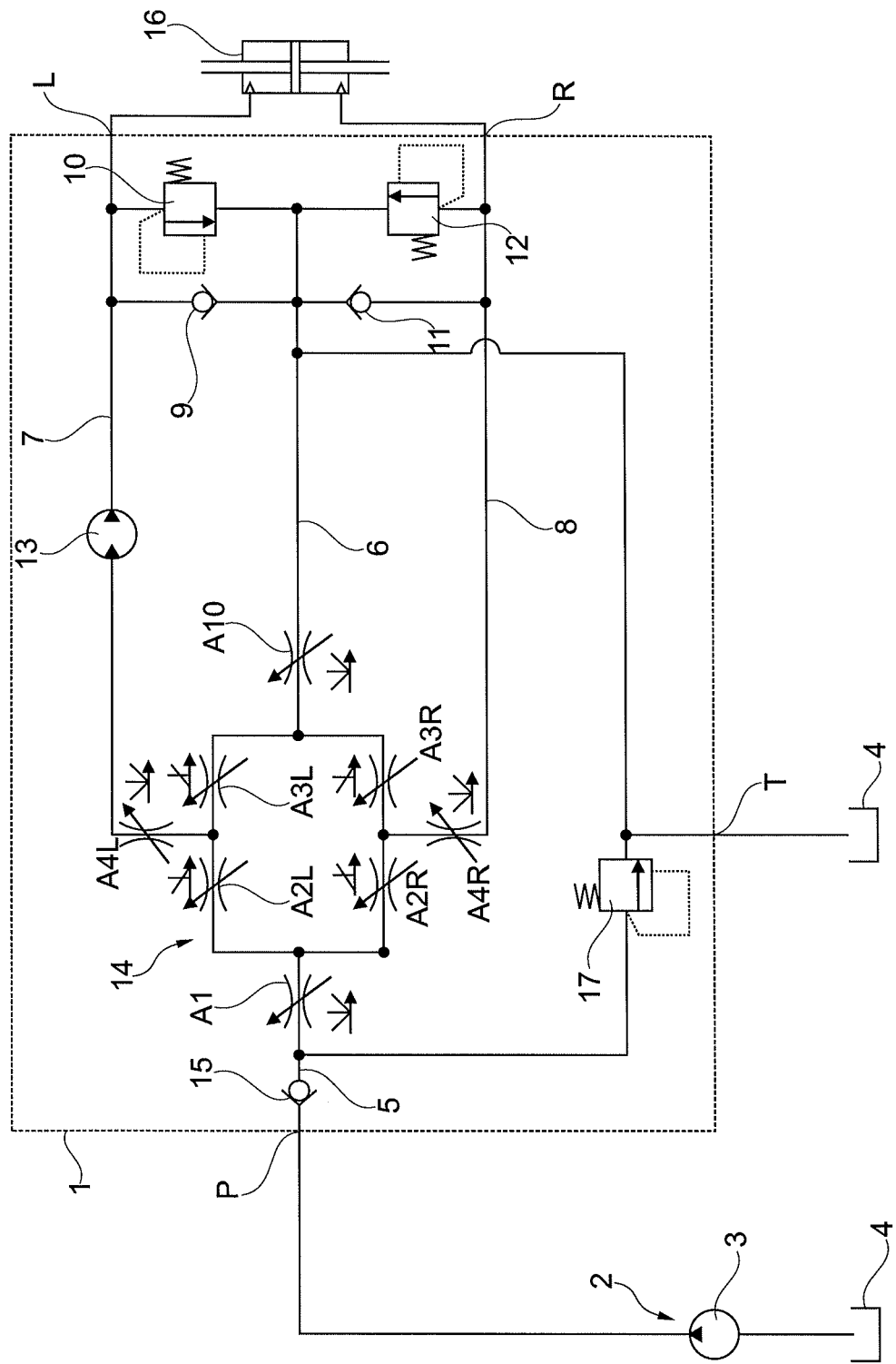

HYDRAULIC STEERING UNIT

CROSS-REFERENCE TO RELATED APPLICATION

This application claims foreign priority benefits under U.S.C. § 119 to German Patent Application No. 10 2017 109 799.6 filed on May 8, 2017, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable neutral open orifices, said bridge arrangement comprising a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path.

BACKGROUND

The bridge arrangement is in form of a Wheatstone bridge. When, for example, it is desired to steer a vehicle equipped with such a steering unit to the left, the first left orifice is opened and the second right orifice is opened. The other two orifices of the bridge arrangement are closed. Hydraulic fluid under pressure from the pressure port flows through the first left orifice, the left working flow path to the left working port and is supplied to a steering motor which is connected to the working port arrangement. Fluid displaced from the steering motor enters the steering unit through the right working port and flows through the right working flow path, the second right orifice and the tank flow path back to the tank port.

The use of neutral open orifices has the advantage that steering can be performed very smoothly out of the neutral position. A variable neutral open orifice allows a small predetermined flow even in the neutral position of the steering unit.

SUMMARY

The object underlying the invention is to have a good steering behavior in a closed-center solution.

This object is solved with a hydraulic steering unit as described at the outset in that a further variable orifice arrangement is arranged between the supply port arrangement and the working port arrangement, which orifice arrangement is closed in neutral position.

The bridge arrangement of the variable orifices can remain in the neutral open configuration. However, a further orifice arrangement interrupts a flow of hydraulic fluid from the supply port to the tank port in neutral condition of the steering unit. This has advantages known from a closed-center solution of a hydraulic steering unit. When the steering unit is actuated to come out of the neutral position, the variable orifice arrangement opens and allows immediately a flow of hydraulic fluid through the bridge arrangement so that the bridge arrangement can start steering in the smooth manner.

In an embodiment of the invention a measuring motor is arranged in one of the working flow paths. When the measuring motor is arranged in one of the working flow paths this has the advantage that the steering unit has no or at least a minimum dead band and the driver has a very comfortable feeling when steering.

In an embodiment of the invention a main orifice is arranged in the main flow path upstream the variable first left orifice and the variable first right orifice, the main orifice forming at least part of the orifice arrangement. When the main orifice is closed, no flow can pass to the bridge arrangement. The bridge arrangement is pressure released.

In an embodiment of the invention a variable tank orifice is arranged in the tank flow path, the tank orifice forming at least part of the orifice arrangement. The interruption of the hydraulic circuit in the neutral condition can also or additionally be made in the tank flow path.

In an embodiment of the invention a variable third left orifice is arranged in the left working flow path and a variable third right orifice is arranged in the right working flow path, the left orifice and the right orifice forming at least part of the orifice arrangement. It is also possible to interrupt the flow of hydraulic fluid through the steering unit by blocking or interrupting the working flow path in the neutral condition.

BRIEF DESCRIPTION OF THE DRAWINGS

An embodiment of the invention will now be described in more detail with reference to the drawing, in which:

The only FIGURE shows a schematic circuit diagram of a steering unit.

DETAILED DESCRIPTION

A steering unit 1 comprises a supply port arrangement having a pressure port P and a tank port T. The pressure port P can be connected to a pressure source 2 in form, for example, of a pump 3. The tank port T is connected to a tank 4.

The pressure port P is connected to a main flow path 5. The tank port T is connected to a tank flow path 6.

Furthermore, the steering unit 1 comprises a working port arrangement having a left working port L and a right working port R. The left working port L is connected to a left working flow path 7. The right working port R is connected to a right working flow path 8.

In a way known per se the tank flow path 6 is connected to the left working flow path 7 by means of a check valve 9 and by means of a pressure relief valve 10. In the same way the right working flow path 8 is connected to the tank flow path 6 by means of a check valve 11 and by means of a pressure relief valve 12.

A measuring motor 13 is arranged in the left working flow path 7. As an alternative the measuring motor 13 can be arranged in the right working flow path 8.

Control of hydraulic fluid from the pressure port P to the working port arrangement L, R and back to the tank port T is performed by means of bridge arrangement 14. The bridge arrangement 14 comprises four variable orifices which are open in neutral position of the steering unit 1. In other words, in the neutral position of the steering unit 1 the orifices of the bridge arrangement 14 allow a small flow of hydraulic fluid.

The bridge arrangement 14 comprises a first left orifice A2L connecting the main flow path 5 and the left working flow path 7, a second left orifice A3L connecting the left working flow path 7 and the tank flow path 6, a first right orifice A2R connecting the main flow path 5 and the right working flow path 8 and a second right orifice A3R connecting the right working flow path 8 and the tank flow path 6.

The throttling behavior of the orifices A2L, A3L, A2R, A3R is shown above the orifices. It can be seen that the opening degree of the orifices in the neutral point is not zero.

The use of neutral open variable orifices A2L, A3L, A2R, A3R has the advantage that the steering out of the neutral position of the steering unit 1 can be performed very smoothly.

However, since the steering unit 1 should function as a closed-center solution, a further variable orifice arrangement is arranged between the supply port arrangement P, T and the working port arrangement L, R. This further orifice arrangement is closed in neutral position.

In a first embodiment a main orifice A1 is arranged in the main flow path 5 upstream the variable first left orifice A2L and the variable first right orifice A2R. The main orifice A1 forms at least part of the further orifice arrangement. As can be seen by the symbol below the main orifice A1, the main orifice A1 is closed in neutral position of the steering unit 1.

In addition or alternatively to the main orifice A1 a tank orifice A10 can be arranged in the tank flow path 6. The symbol below the tank orifice A10 clearly shows that the tank orifice A10 is closed in the neutral position.

In a further embodiment a variable left orifice A4L is arranged in the left working flow path 7 and a variable right orifice A4R is arranged in the right working flow path 8. Again, the symbols associated to the third left orifice A4L and to the third right orifice A4R clearly show that these two third orifices are closed in neutral position.

It should be clear that the further orifice arrangement could have all of the orifices 1, A10, A4L, A4R or only a sub combination thereof. When a third orifice is used in one of the working flow paths 7, 8, the other working flow paths 8, 7 is equipped with a third orifice as well.

A check valve 15 is arranged in the main flow path 5 opening in a direction towards the bridge arrangement 14.

A steering motor 16 is connected to the working port arrangement L, R.

A relief valve 17 is arranged between a point downstream the check valve 15 and the tank port T.

The operation of the steering unit 1 can be briefly described as follows.

In the neutral position of the steering unit 1 the orifices A2L, A3L, A2R, A3R of the bridge arrangement 14 are slightly opened and would allow for a small flow of fluid through the bridge arrangement. However, the main orifice A1 (and/or the tank orifice A10 and/or the third orifices A4L, A4R) are closed, so that no flow of hydraulic fluid flow can occur between the pressure port P and the tank port T.

When the steering unit 1 is actuated, for example, to steer a vehicle equipped with the steering motor 16 to the left, the main orifice (A1 and/or the tank orifice A10 and/or the third orifices A4L, A4R) are immediately opened. The opening of these orifices is faster than the opening of other orifices. Furthermore, the first left orifice A2L opens, the second left orifice A3L closes, the first right orifice A2R closes and the second right orifice A3R opens. Hydraulic fluid under pressure flows from the pressure port P through the main flow path 5, the main orifice A1 (which is now open), the first left orifice A2L, the third left orifice A4L (which is open as well), the measuring motor 13 and through the left working flow path 7 to the left working port L and from there to the steering motor 16. Hydraulic fluid displaced from the steering motor 16 flows back to the right working port R and through the right working flow path 8, the third right orifice A4R, the second right orifice A3R and the tank orifice A10 to the tank port T.

When, for example, the orifices are formed in a spool-sleeve-set, the orifices are opened and closed by a rotation of the sleeve relative to the spool. The measuring motor 13 is operatively connected to one of the spool and the sleeve and returns to the spool-sleeve-set back to the neutral position once the required amount of hydraulic fluid has been supplied to the steering motor 16.

When the steering unit is returned back to neutral position, the main orifice A1 closes. Hydraulic fluid from the pressure port P is now guided back to the tank port T via the relief valve 17.

When a pressure source 2 with a variable displacement is used, the relief valve 17 can be omitted.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A hydraulic steering unit comprising:
a supply port arrangement having a pressure port (P) connected to a main flow path and a tank port (T) connected to a tank flow path, a working port arrangement having a left working port (L) connected to a left working flow path and a right working port (R) connected to a right working flow path, a bridge arrangement of variable neutral open orifices, said variable neutral open orifices of said bridge arrangement comprising:
a variable first left orifice (A2L) connected to the main flow path and to the left working flow path,
a variable first right orifice (A2R) connected to the main flow path and to the right working flow path,
a variable second left orifice (A3L) connected to the left working flow path and to the tank flow path, and
a variable second right orifice (A3R) connected to the right working flow path and to the tank flow path,
wherein a further variable orifice arrangement is arranged between the pressure port (P) and/or the tank port (T) of the supply port arrangement and the working port arrangement, which further variable orifice arrangement is closed in a neutral position of the hydraulic steering unit,
wherein the further variable orifice arrangement includes a main orifice (A1) arranged in the main flow path upstream the variable first left orifice (A2L) and the variable first right orifice (A2R), the main orifice (A1) being closed in the neutral position to close the main flow path, a variable tank orifice (A10) arranged in the tank flow path, the variable tank orifice (A10) being closed in the neutral position, and/or a variable third left orifice (A4L) arranged in the left working flow path and a variable third right orifice (A4R) arranged in the right working flow path, the variable third left orifice (A4L) and the variable third right orifice (A4R) being closed in the neutral position.

2. The hydraulic steering unit according to claim 1, wherein a measuring motor is arranged in one of the working flow paths.

\* \* \* \* \*